June 4, 1968   A. A. RICHARDSON   3,386,313
STEERING MECHANISM FOR WATERBORNE VESSEL
Filed Oct. 8, 1965   3 Sheets-Sheet 1
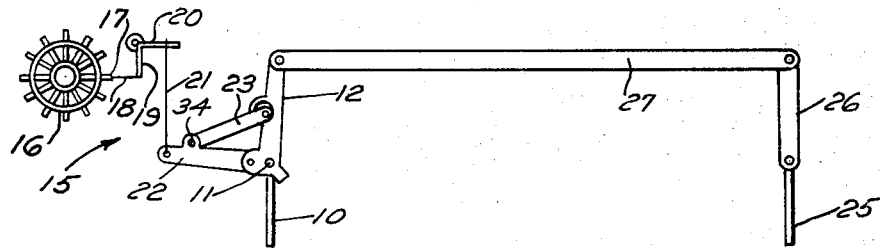
FIG. 1
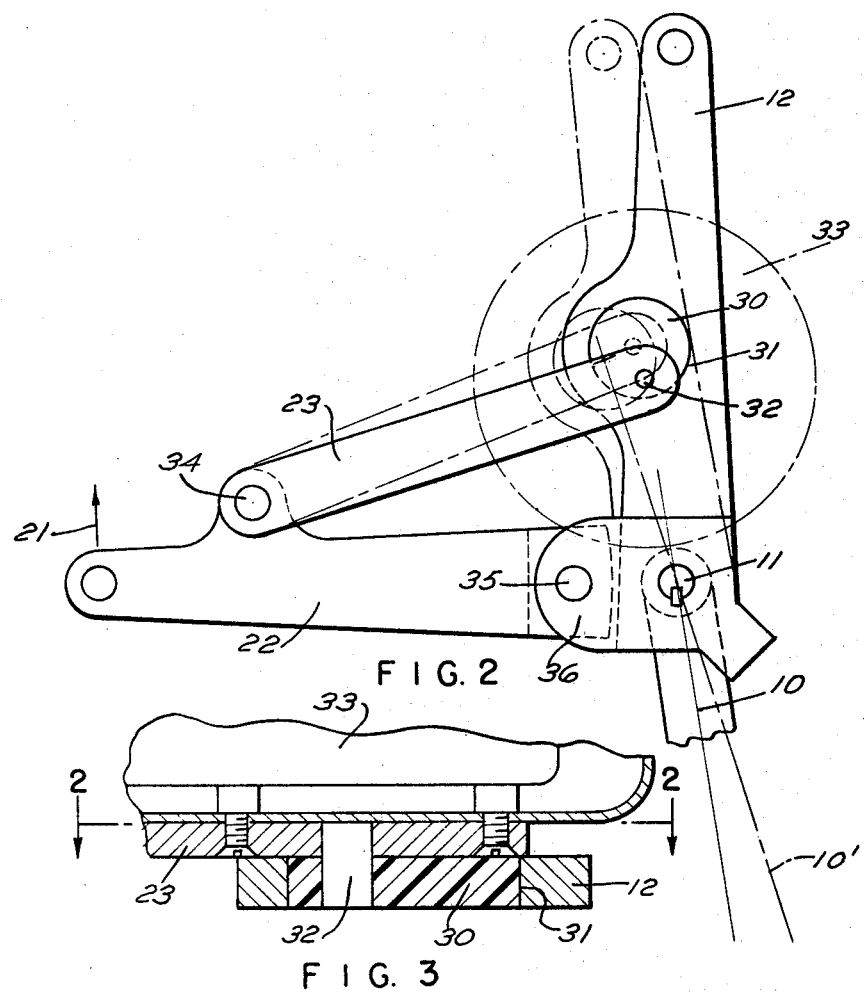
FIG. 2
FIG. 3
INVENTOR.
ARTHUR A. RICHARDSON
BY
*Barlow & Barlow*
ATTORNEYS

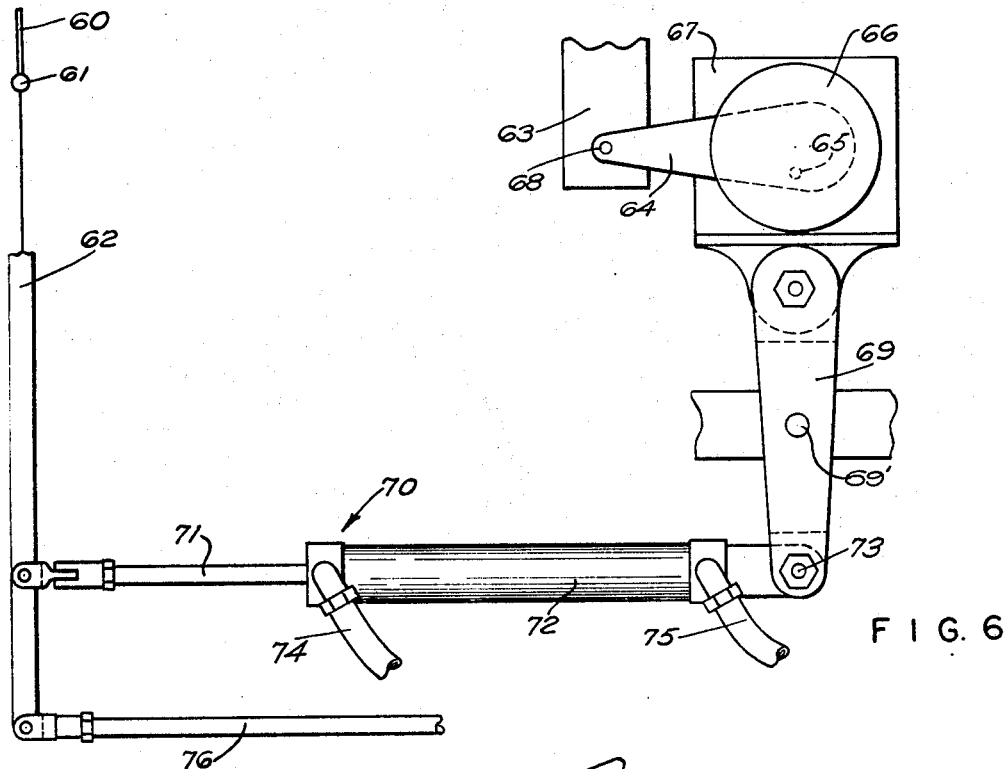
FIG. 6
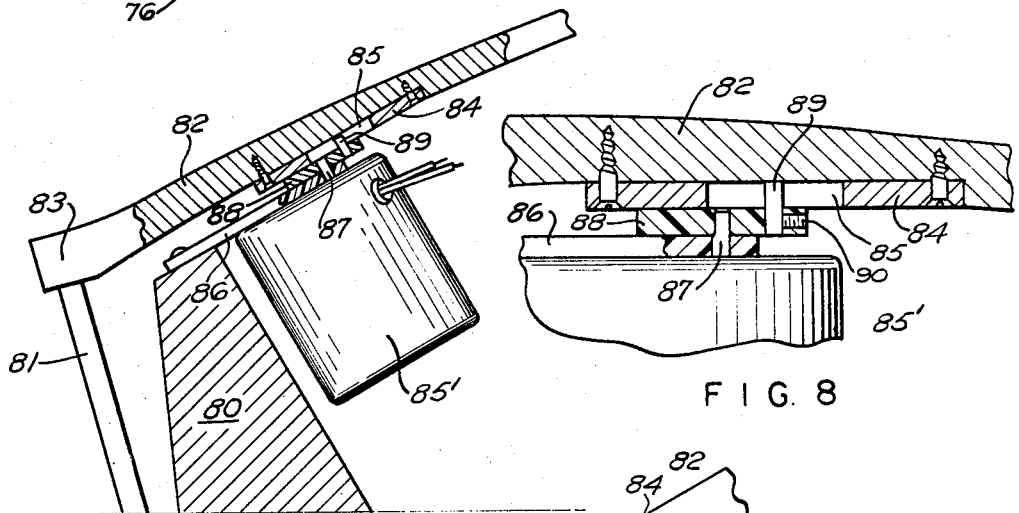
FIG. 7
FIG. 8
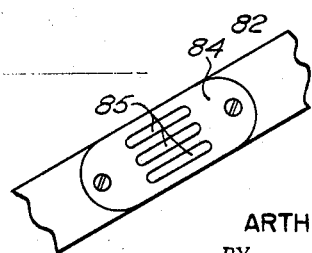
FIG. 9

United States Patent Office 3,386,313
Patented June 4, 1968

3,386,313
STEERING MECHANISM FOR
WATERBORNE VESSEL
Arthur A. Richardson, 79 Rutherford Ave.,
Warwick, R.I. 02886
Filed Oct. 8, 1965, Ser. No. 493,988
4 Claims. (Cl. 74—625)

ABSTRACT OF THE DISCLOSURE

A steering device for waterborne vessel involving both manual steering and power steering, particularly automatic power steering frequently referred to as an automatic pilot.

---

All vessels are equipped with a manual steering mechanism and frequently vessels are equipped with a power-operated means for steering the vessel automatically from some compass control. It is usual that some arrangement is provided for clutching in the automatic control when it is to be operated, and if the manual control is to be used, then a de-clutching of the automatic control is necessary in order that the manual control may be operated.

One of the objects of this invention is to provide a hook-up between the manual steering mechanism and the power-operated means so that no clutching or de-clutching is necessary in order to operate either, the arrangement being such that even though the power means is in operation, the manual means may be operated to over control the power means without any de-clutching or clutching action between the two.

Another object of the invention is to provide an arrangement so that when the power means for steering the vessel is in operation, the manual steering means will remain inoperative and rotation of the wheel which usually operates the manual steering mechanism will not be turning but rather will be inactive.

Another object of the invention is to provide an arrangement which may be superimposed on or added to the usual manual steering mechanism of a vessel without an entire reconstruction thereof.

With these and other objects in view, the invention consists of certain novel features of construction as will be more fully described and particularly pointed out in the appended claims.

In the accompanying drawings:

FIG. 1 is a schematic view illustrating a pair of rudders, a connection between them and a connection to the manual steering mechanism of the vessel including the mechanism of this invention in its relation to the rudders;

FIG. 2 is a top plan view on a larger scale to show greater detail of the inventive part of the construction and is substantially on line 2—2 of FIG. 3;

FIG. 3 is a section substantially through the eccentric with the motor shown;

FIG. 6 is a schematic view illustrating a still further modified arrangement where a power steering device is utilized;

FIG. 7 is an elevation partly broken away and in section showing a modified form of power steering device;

FIG. 8 is an enlarged fragmental section of a portion shown in FIG. 7; and

FIG. 9 is a bottom plan view of the plate secured to the under part of the steering arm.

Figure 4:
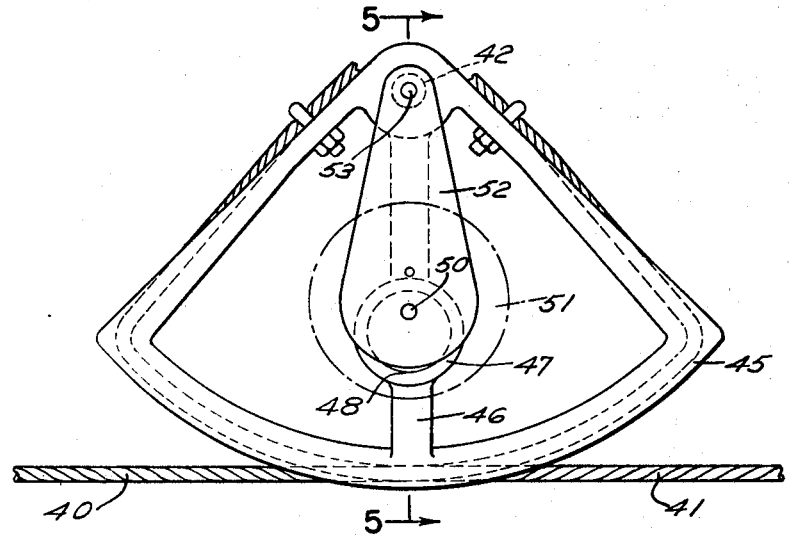
FIG. 4 is a plan view of a modified arrangement.

In proceeding with this invention, I have provided an arm connected to the rudder and a power means from an automatic pilot connected to this arm in such a way that the arm will be responsive to the power means of the automatic pilot. This may conveniently be done by a cam or eccentric to cause the rudder arm to move. The manual steering mechanism for the rudder arm is movably related to the arm that controls the rudder so that it may remain inoperative usually by means of the friction which is existent in such manual steering mechanism while the rudder is operated by the power means of the automatic pilot. However, should it be desirable, at any time, either while the power means is operating or when it is not operating, to control the vessel by the manual steering mechanism, the manual steering mechanism may be manipulated to over control the power means so that steering will be effected by the manual steering mechanism.

With reference to the drawings and particularly to FIG. 1, 10 designates a rudder secured to its pivotally mounted rudder post 11 which may rock in suitable bearings. An arm 12 is secured to the rudder post so as to move therewith so that should the arm be moved, it will cause movement of the rudder post and the rudder. A manually steering mechanism designated generally 15 is illustrated as comprising a steering wheel 16 having a crank arm 17, a link 18 connected to one leg 19 of a crank lever while the other leg 20 thereof is connected by a link 21 to an arm 22 pivoted to the arm 12 and also connected thereto by a link 23 as will appear in greater detail hereinafter. A second rudder 25 having an arm 26 is connected by a link 27 to the arm 12 so as to operate in unison therewith as is usual on vessels having two rudders, and it will be understood that where I refer to a single rudder that a second rudder may be coupled thereto in a similar manner in all cases.

Referring now to FIG. 2, the arm 12 which is keyed to the rudder post 11 has an eccentric 30 which is fitted in a bearing 31 in the arm 12. This eccentric is fixed on a shaft 32 to which link 23 is pivotally connected and this shaft 32 is driven by motor 33 mounted on link 23. The arm 22 is pivoted as at 35 in the bifurcated portion 36 fixed to the arm 12. This arm 22 is connected as at 21 in the manual steering mechanism, and there will be sufficient friction in this manual steering mechanism so that when motor 33 operates shaft 32 to rotate the eccentric 30, the arm 12 will swing about the rudder post as a center such as from the full line position shown in FIG. 2 to the dotted line position shown in FIG. 2 to cause the rudder to be moved into the position 10′ shown in FIG. 2. The friction of the manual steering mechanism will hold the arm 12 relatively stationary while a link 23 will rock about pivot 34. The steering wheel and its connecting rod, however, will remain stationary. Thus, there is a movement of the rudder by means of the power means without operating the manual steering mechanism. However, as the manual steering mechanism is at all times connected to the rudder arm, any movement manually of the wheel 16 will cause the rudder to be operated and the power means will in effect be over controlled and this may occur whether the power means is operative or inoperative as the motor which causes the operation is mounted upon the link 23 to move therewith and the wires which are connected to the motor will be readily sufficiently flexible so that this may occur.

Figure 5:
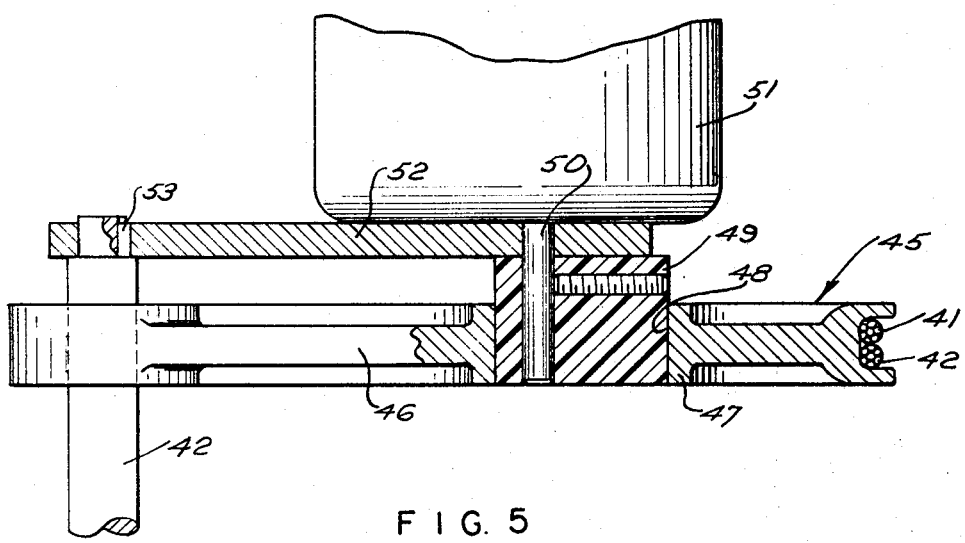
FIG. 5 is a sectional view of FIG. 4 on line 5—5 thereof.

In the showing in FIGS. 4 and 5, there is a quadrant used in the steering mechanism. Cables 40 and 41 extend from this quadrant so as to manually manipulate it about its axis of swing. The axis of swing, however, is the center of the rudder post which is now designated as 42 and whereas usually the quadrant is keyed to the rudder post, in this invention the quadrant 45 is mounted to swing on the rudder post. The quadrant 45 is provided with a spoke 46 which has an enlarged portion 47 providing a bearing 48 for an eccentric 49 which is fixed to the shaft 50 of a motor 51 fixed on arm 52 which is keyed to the rudder post as at 53 so as to turn therewith. The friction of the cables 41, 42 and other parts of the steering mechanism will hold the quadrant relatively stationary while the motor shaft 50 when it rotates will cause the motor and its arm 52 to swing and turn the rudder post by movement about the center of the rudder post, and as the quadrant does not move during this situation, there will be no movement of the manual steering mechanism. However, should it be desired to over control the power means to the rudder post, it is merely necessary to manually turn the quadrant, which being connected through the arm 52 and shaft 50 to the rudder post will cause the manual steering mechanism to be effective whether the motor is operating to turn its shaft or is inoperative. The eccentric 49 may be mounted in a separate arm to be attached to the quadrant with the bearing for the eccentric in the separate arm where a quadrant which does not have a spoke, such as 46 is found.

In FIG. 6 the rudder is designated 60, the rudder post 61 and an arm 62 extends from the rudder post. From a fixed part of the vessel 63, there is pivotally mounted an arm 64 which mounts a motor (not shown) having a shaft 65 extending therefrom to operate an eccentric 66 which rotates in a block 67 so as to move this block as the eccentric rotates. The block may swivel about a connection 68 attached to the boat 63. This block 67 is connected to the arm 62 by means of a lever 69 pivoted at 69' to a fixed part of the boat and by means 70 which may incorporate a manually controlled power steering mechanism. When this power mechanism is not operating, the connecting means 70 consists essentially of two telescoping parts, one of which, a piston rod 71, is connected to the arm 62 while the other part, a cylinder 72, is connected as at 73 to block 67. This rod 71 has a piston at one end thereof located in the embracing cylinder 72 so that when fluid is forced into one end of the cylinder 74, the piston will be moved in one direction while when forced into the other end 75 the piston will be moved in the other direction. The fluid means for operating the piston in one direction or the other is controlled from a wheel of the manual steering mechanism and is manually operated. Some sort of a lever 76 comparable to the link 27 (of FIG. 1) may be connected to a second rudder. The connections 74 and 75 are flexible so that when the power means is operating the shaft 65 to turn the eccentric 66 from the automatic power device, the block rocks to effectively move the arm 62 in one direction or the other to operate the rudder 60. However, the connection such as the piston and cylinder is always in the operating train and if at any time it is desired to over control the automatic pilot means, it is merely necessary to operate the manual mechanism for operating the power device 70 to apply fluid pressure at one end or the other of the piston to over control the automatic pilot.

In FIGS. 7, 8 and 9, the stern portion of the boat is designated 80 and the rudder post 81 upon which the steering arm or tiller 82 is mounted for rotating the rudder post 81. This tiller is pivoted as at 83 so that it may be swung upwardly if desired. On the underside of the tiller there is a plate 84 mounted which is provided with a plurality of slots 85. The motor for operating the steering mechanism variously designated in the other views but here designated as 85' is fixedly mounted on an arm 86 in the stern portion of the boat and has a shaft 87 upon which there is mounted an eccentric 88 having the eccentric pin 89 fixed therein such as by a set screw 90. This pin 89 will enter any one of the slots 85 in the plate 84, and as the motor rotates, the shaft 87 will swing the pin 89 which is eccentric to the shaft 87 so as to move the tiller or steering arm 82. If it is desired to manually steer, the tiller may be lifted off of the eccentric pin 89 and manual steering may occur. When manual steering is completed, the tiller may be swung downwardly about its hinge 83 so that the pin will enter one of the slots 85.

I claim:

1. In a vessel having a steering mechanism for steering a rudder, linkage means adapted to positively connect the steering mechanism to the rudder to enable the rudder to be steered, and power means operatively connected to said linkage means for steering said rudder independently of said steering means, said power means comprising a reversible electric motor mounted on one of the linkages of said linkage means for movement therewith for moving said one linkage in one direction when the motor is actuated in one direction and for moving said one linkage in the opposite direction when the motor is actuated in its opposite direction, the movement of said one linkage steering said rudder independently of said steering means, said linkage means providing a positive steering connection between said rudder and said steering mechanism while said one linkage is moving and in all positions of said one linkage.

2. The invention as defined in claim 1 wherein said linkage means includes a second linkage positively connected to said one linkage by said power means, and wherein said power means comprises means mounting said motor on said one linkage for movement therewith, and motion transmitting means connecting the output shaft of said motor to said second linkage, said motion transmitting means moving said linkages apart from one another when the motor output shaft is rotated in one direction and moving said linkages toward one another when the motor output shaft is rotated in the opposite direction, the relative movement between said linkages steering said rudder independently of said steering means.

3. The invention as defined in claim 1 including an eccentric connected to the output shaft of said motor for rotation thereby, said eccentric being operably connected to another linkage of said linkage means.

4. In a vessel having a rudder post, an arm fixed to the rudder post, rotary power means, and means including an eccentric for connecting said rotary power means to said arm to move said arm about said rudder post as an axis.

References Cited

UNITED STATES PATENTS

| 3,106,852 | 10/1963 | Miller | 74—625 |
| 3,263,639 | 8/1966 | Wallace | 114—144 |
| 1,692,666 | 11/1928 | Koons | 114—150 |
| 2,583,407 | 1/1952 | Binder | 74—625 X |
| 2,724,289 | 11/1955 | Wight | 74—625 |
| 3,305,031 | 2/1967 | Bez et al. | 74—571 X |

FRED C. MATTERN, JR., *Primary Examiner.*

W. S. RATLIFF, *Assistant Examiner.*